United States Patent [19]
Tsurumoto et al.

[11] Patent Number: 6,028,532
[45] Date of Patent: Feb. 22, 2000

[54] AUTOMATIC PRODUCT CONVEYING SYSTEM

[75] Inventors: Shinsaku Tsurumoto, Oyama; Harunobu Tateno, Kawachi-gun; Mineo Gamo, Yuki; Sadao Kakizawa, Utsunomiya; Katsuji Kobayashi, Oyama, all of Japan

[73] Assignee: Fujitsu Limited, Kawasaki, Japan

[21] Appl. No.: 08/194,748

[22] Filed: Feb. 10, 1994

Related U.S. Application Data

[62] Division of application No. 08/023,856, Feb. 24, 1993, abandoned, which is a continuation of application No. 07/776,227, Nov. 13, 1991, abandoned, which is a continuation of application No. PCT/JP91/00287, Mar. 4, 1991.

[30] Foreign Application Priority Data

Mar. 15, 1990 [JP] Japan ............................ 2-62708

[51] Int. Cl.[7] ................................................ H04Q 1/00
[52] U.S. Cl. .................. 340/825.53; 364/468.2; 198/349
[58] Field of Search ................ 340/825.23, 825.22, 340/825.54, 825.06, 825.08, 825.16; 198/364.1, 349.5, 349.6, 349.7, 349.95, 349, 350, 415.1; 29/33 P; 414/222, 273; 364/424.01, 478, 468.2

[56] References Cited

U.S. PATENT DOCUMENTS

| | | | |
|---|---|---|---|
| 3,796,327 | 3/1974 | Meyer et al. | 414/273 |
| 3,854,889 | 12/1974 | Lemelson | 198/346.1 |
| 4,144,960 | 3/1979 | Scourtes | 198/346.1 |
| 4,538,950 | 9/1985 | Shiomi et al. | 414/222 |
| 4,715,490 | 12/1987 | Date et al. | 198/346.1 |
| 4,827,395 | 5/1989 | Anders | 340/825.54 |
| 4,843,640 | 6/1989 | Juengel | 340/825.54 |
| 4,862,160 | 8/1989 | Ekchian | 340/825.54 |
| 5,006,996 | 4/1991 | Nakamura | 340/825.54 |
| 5,008,661 | 4/1991 | Raj | 340/825.54 |
| 5,017,084 | 5/1991 | Lemelson | 414/744.3 |
| 5,056,028 | 10/1991 | Ohta et al. | 364/478 |

FOREIGN PATENT DOCUMENTS

| | | |
|---|---|---|
| 0 260 086 | 3/1988 | European Pat. Off. . |
| 0 265 626 | 5/1988 | European Pat. Off. . |
| 60-193022 | 1/1985 | Japan . |
| 62-218393 | 9/1987 | Japan . |
| 63-47206 | 2/1988 | Japan . |
| 63-155308 | 6/1988 | Japan . |
| 1-183342 | 7/1989 | Japan . |

OTHER PUBLICATIONS

Supplementary European Search Report for Application No. EP 91 90 4819.

IBM Technical Disclosure Bulletin, vol. 27, No. 6, Nov. 1984, "Improved AGVS Work Station" by N.A. Swenson, Jr.

*Primary Examiner*—Brian Zimmerman
*Attorney, Agent, or Firm*—Stass & Halsey LLP

[57] ABSTRACT

Along an annular conveyance path there are provided plural work stations 4a, 4b, 4c and a warehouse 6 for temporary storage of products. Between the work stations 4a, 4b, 4c and the conveyance path there are disposed station conveyors 10. Further, a buffer mechanism 12 comprising a parting conveyor 14 and a stock conveyor 16 is interposed between the warehouse 6 and the conveyance path 2. Products are conveyed between the work stations 4a, 4b, 4c and the warehouse 6 by means of a carrier 8 which moves on the conveyance path 2.

6 Claims, 10 Drawing Sheets

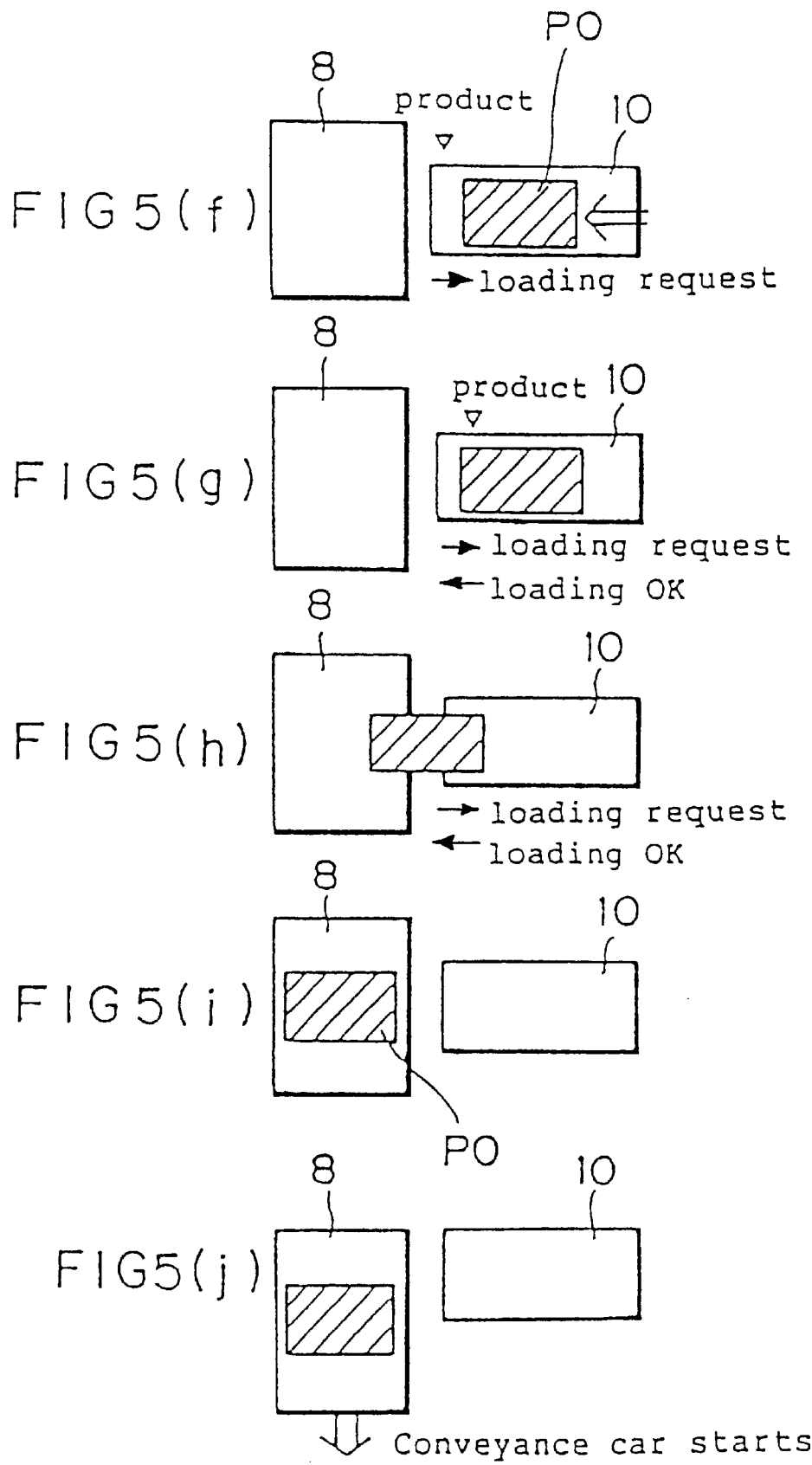

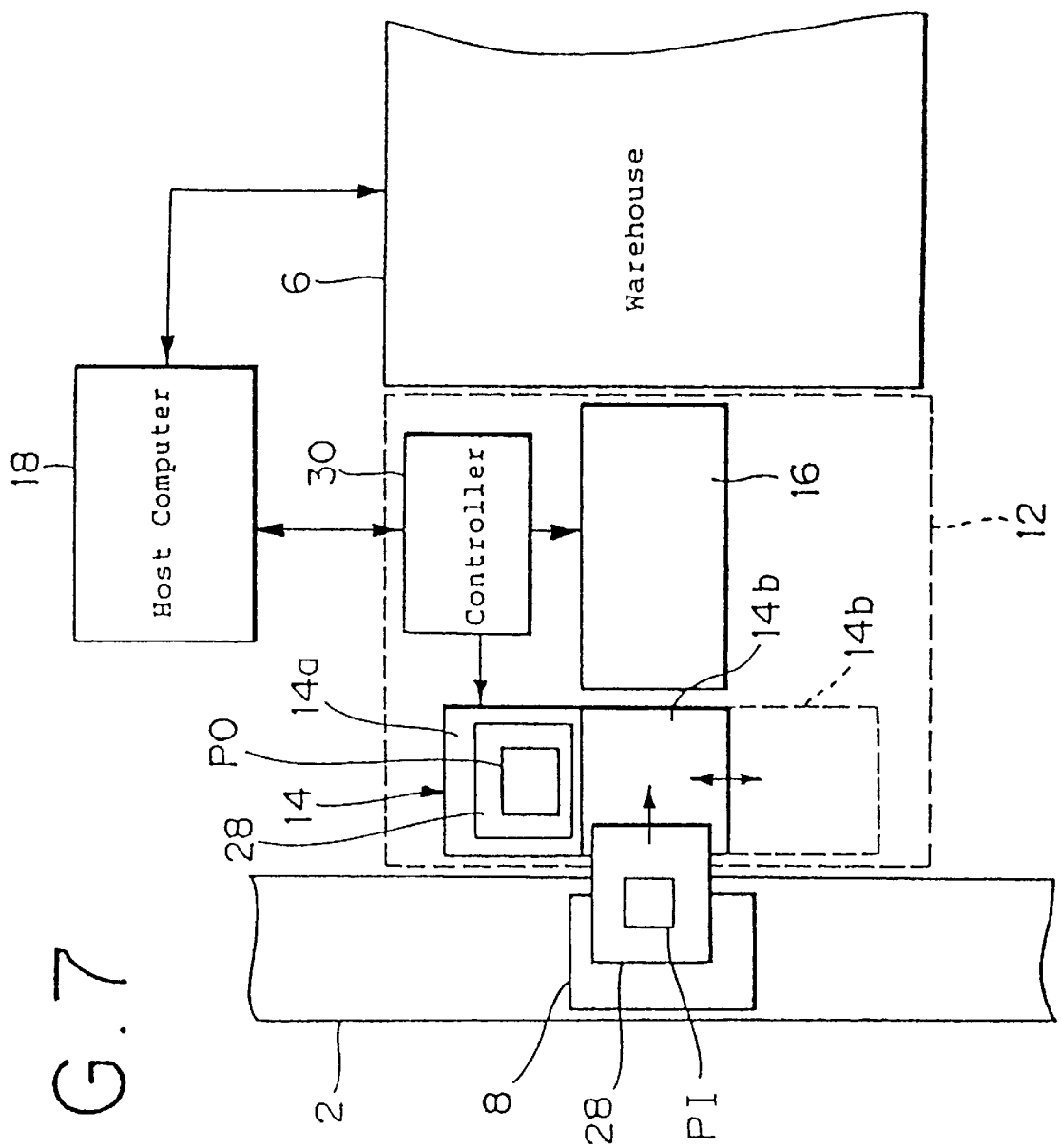

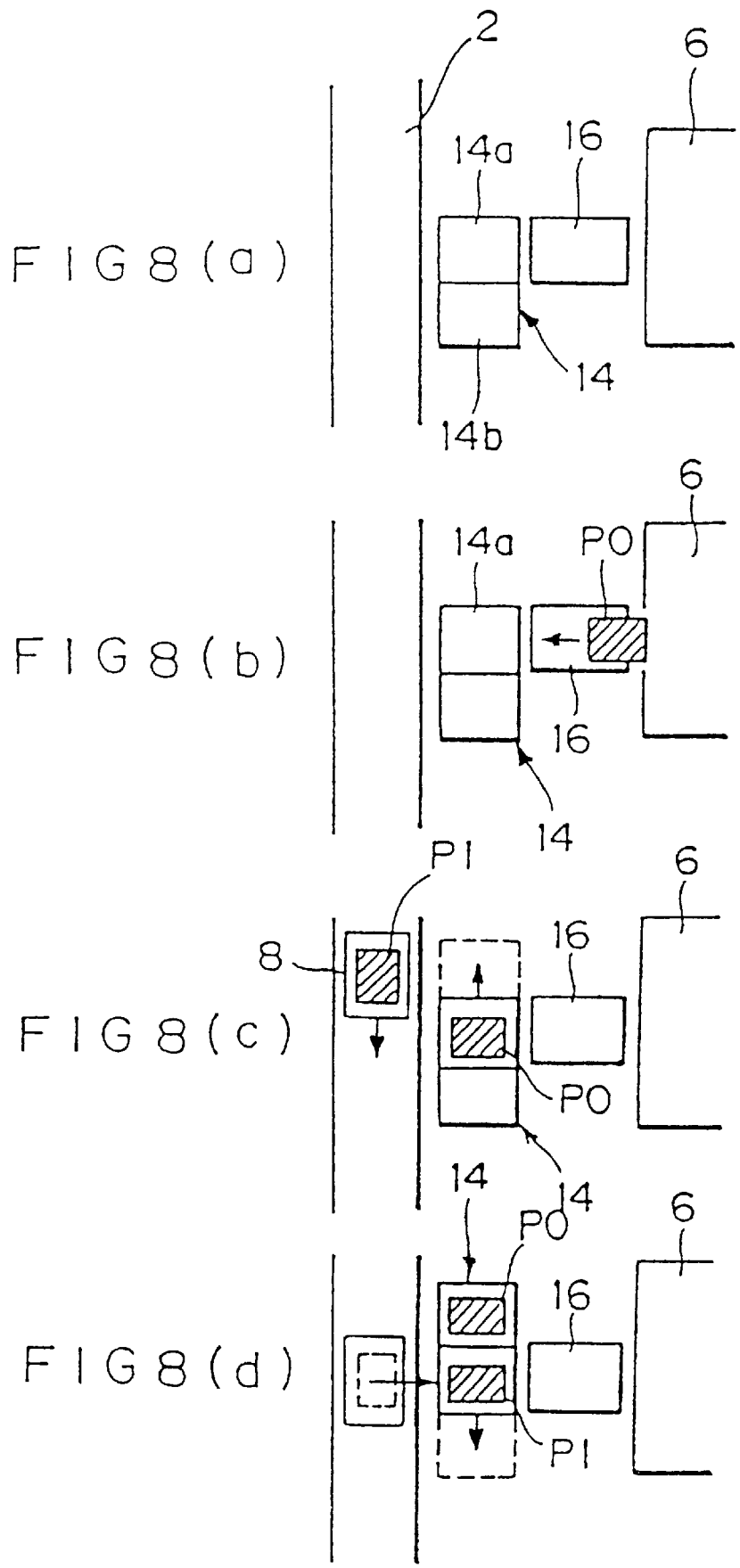

AUTOMATIC PRODUCT CONVEYING SYSTEM

This application is a division of application Ser. No. 08/023,856, filed Feb. 24,1993, now abandoned, which a continuation of 07/776,227, filed on Nov. 13, 1991, also abandoned which is a continuation of PCT/JP91/00287 filed Mar. 4, 1991.

BACKGROUND OF THE INVENTION

1. Field of the Invention

The present invention relates to an automatic product conveying system in a factory.

2. Description of the Related Art

In general, a production control system is composed of a process controller which connects plural work stations with a warehouse through a conveyance means such as, for example, an unmanned automatic conveyance car and controls the work stations; a conveyance controller for controlling the conveyance means; and a host computer which performs the exchange of information between it and the said controllers and gives instructions to the controllers on the basis of a work plan and a process procedure. A production control system called FMS (Flexible Manufacturing System) has realized a production system capable of coping with multi-variety, small lot production wherein predetermined works are performed while various products are flowing through work stations in accordance with a predetermined procedure.

In such production control system, a carrier receives products at a certain work station and conveys the products to another work station along a conveyance path, in which station there is effected a desired work such as inspection for example. Between the carrier which travels by itself on the conveyance path and each work station there is provided a station conveyor for the reception and delivery of products between the carrier and each work station. According to the prior art, when loading and unloading of products are to be performed using one station conveyor, a control system for the carrier and a control system for the station conveyor are linked together and a distinction is made between the loading of products to the carrier and the unloading of products from the carrier.

Unless the carrier control system and the station conveyor control system are linked together, an empty loading may be done when product is to be loaded to the carrier, or another product is already present on the station conveyor side when product is to be unloaded from the carrier, which may cause collision of the products with each other on the station conveyor. However, linking the carrier control system and the station conveyor control system with each other gives rise to the problem that the control systems become complicated, resulting in an increase of cost.

Products are stored in a warehouse and taken out from the warehouse in accordance with a predetermined work plan, but since processing machines and testing apparatus which constitute each work station continue to operate in accordance with a predetermined sequence, so the product delivery timing in taking out product from the warehouse is controlled strictly. This is because once the product delivery timing is disordered, the product processing and testing operations are discontinued. In the conventional systems, therefore, a warehousing port for storing product into a warehouse from the carrier and a delivery port for taking out product from the warehouse and loading it onto the carrier are provided separately between a conveyance path along which the carrier travels by itself and the warehouse, and the operation of the warehousing port and that of the delivery port are controlled by a host computer.

Consequently, in the conventional systems the equipment cost is high and the host computer is required to have both a program for warehousing and a program for delivery.

For solving the above problem, one will easily hit upon the idea of using a port in common for both warehousing and delivery. However, if there is adopted a buffer as such a common port, there newly arises the following problem at the time of concurrence between a product to be warehoused and a product for delivery. Since the collision of the products is to be avoided, the unloading of the product for delivery onto the conveyance path is delayed eventually. Such a delay of the product for delivery impedes the working efficiency of the processing machines and testing apparatus waiting for the supply of product without letup.

SUMMARY OF THE INVENTION

Accordingly, it is an object of the present invention to provide an automatic product conveying system of a simple construction which permits the reception and delivery of products between a carrier and each work station, using a single station conveyor, without linking a carrier control system and a station conveyor control system with each other and without causing collision of products.

It is another object of the present invention to provide an automatic product conveying system which, at the time of concurrence of a product for warehousing and a product for delivery, permits quick delivery of the product while avoiding collision of both products, in the case where there is adopted a buffer as a common port for both warehousing and delivery ports between a conveyance path and a warehouse.

DISCLOSURE OF THE INVENTION

There is provided an automatic product conveying system for conveying products between plural work stations and a product warehouse, including an annular conveyance path provided along the work stations and the product warehouse; a carrier for conveying products along the annular conveyance path; station conveyor means for conveying products from the work stations to the carrier or from the carrier to the work stations; first control means for controlling the operation of the station conveyor means; buffer means disposed between the product warehouse and the conveyance path for the reception and delivery of products between the product warehouse and the carrier; first communication means for the communication of information on the loading and unloading of products between the carrier and the station conveyor means; second communication means for the communication of information on the loading and unloading of products between the carrier and the buffer means; first detector means for detecting the presence of a product on the station conveyor means; and second detector means for detecting the presence of a product which has been unloaded onto the station conveyor means from the carrier.

Preferably, the first communication means comprises first and second light emitting elements provided on the carrier, first and second light sensing elements provided on each station conveyor, third and fourth light emitting elements provided on the station conveyor, and third and fourth light sensing elements provided on the carrier. The first light emitting element outputs an unloading request signal, and the second light emitting elements outputs a loading request signal. On the other hand, the third light emitting element outputs an OK signal in accordance with the unloading request signal when there is no product on the station conveyor means and the fourth light emitting element outputs a loading OK signal in accordance with the loading request signal when the presence of product has been detected by the first detector means and the presence of unloaded product not detected by the second detector means.

Preferably, the buffer means comprises first conveyor means having first and second conveyors disposed in parallel, the first conveyor means being capable of moving between a first position in which the first conveyor occupies predetermined product loading/unloading position and a second position in which the second conveyor occupies the predetermined product loading/unloading position, and a second conveyor means for the reception and delivery of products between the first conveyor means and the warehouse.

According to the present invention, since there is provided the first communication means, e.g. optical communication means, of a simple construction for the communication of information between the carrier and the station conveyor means, it is possible to effect loading and unloading of products with respect to the carrier without collision of the products on the station conveyor means.

Moreover, since the buffer means comprising the foregoing first and second conveyor means is disposed between the conveyance path and the warehouse, even when a product for delivery from the warehouse and a product for storage into the warehouse concur with each other on the buffer means, it is possible to carry the products quickly out of and into the warehouse while avoiding their collision.

BRIEF DESCRIPTION OF THE DRAWINGS

FIGS. 5(a) to 5(j) are explanatory views explaining continuous product unloading and loading operations;

FIG. 7 is a schematic diagram showing a construction of buffer means used in the embodiment; and FIGS. 8(a) to 8(g) are explanatory views explaining operations of the buffer means.

DESCRIPTION OF THE PREFERRED EMBODIMENT

Figure 1:
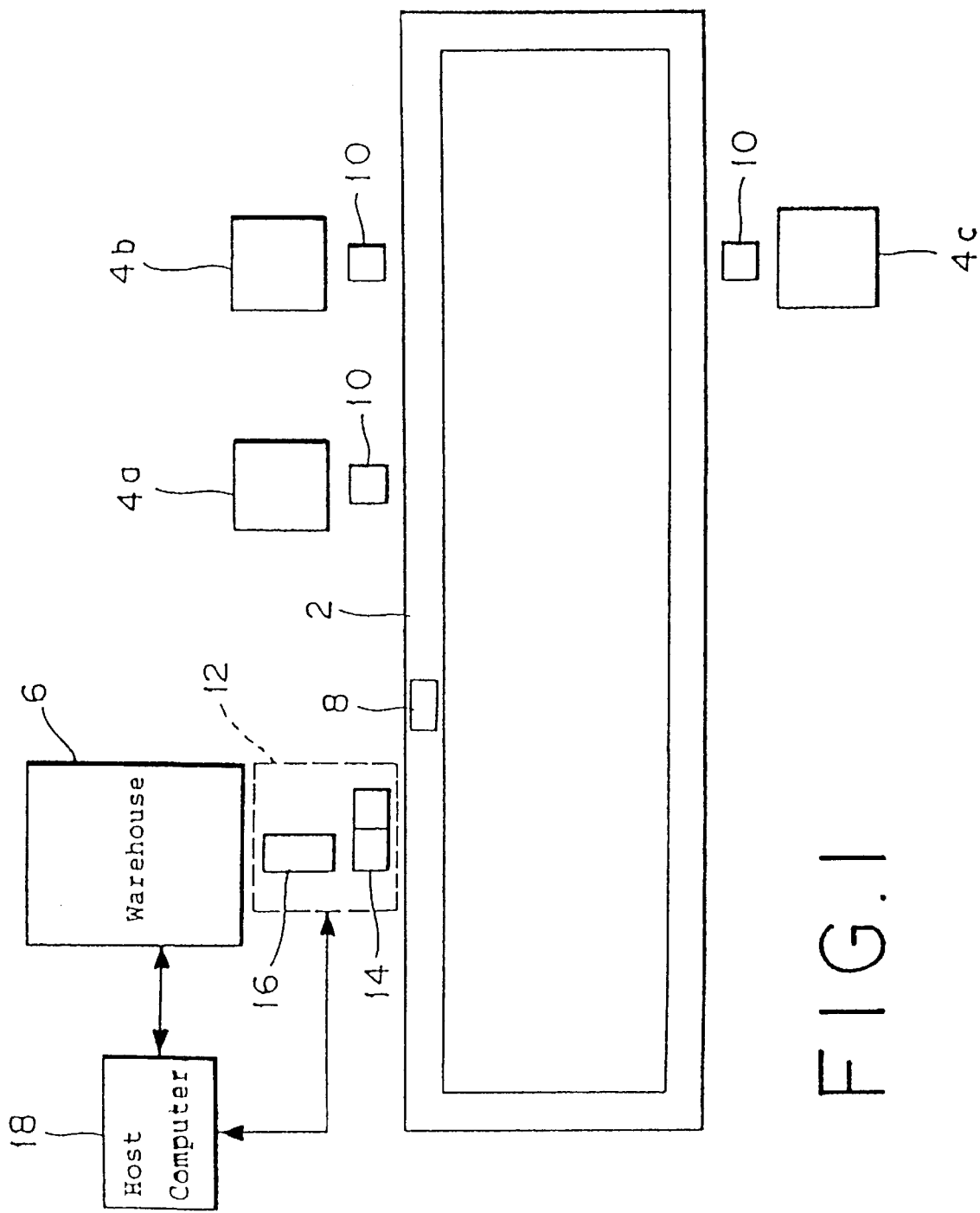
FIG. 1 is a schematic construction diagram of an automatic product conveying system according to an embodiment of the present invention.

Referring to FIG. 1, there is schematically illustrated an automatic product conveying system according to an embodiment of the present invention. Along an annular conveyance path 2 there are disposed plural work stations 4a, 4b, 4c and a warehouse 6 for temporary storage of products. The work stations 4a to 4c each comprise a processing machine for applying some processing to products and a testing apparatus for testing the products. Reference numeral 8 denotes a carrier such as, for example, an unmanned automatic conveyance car for conveying product along the conveyance path 2.

Between the conveyance path 2 and each of the work stations 4a, 4b, 4c there is provided a station conveyor 10, while between the conveyance path 2 and the warehouse 6 there is provided a buffer mechanism 12. The buffer mechanism 12 comprises a parting conveyor 14 capable of moving right and left and a stock conveyor 16 for the reception and delivery of products between the warehouse 6 and the parting conveyor 14. The warehouse 6 and the operation of the buffer mechanism 12 are controlled by a host computer 18.

Figure 2:
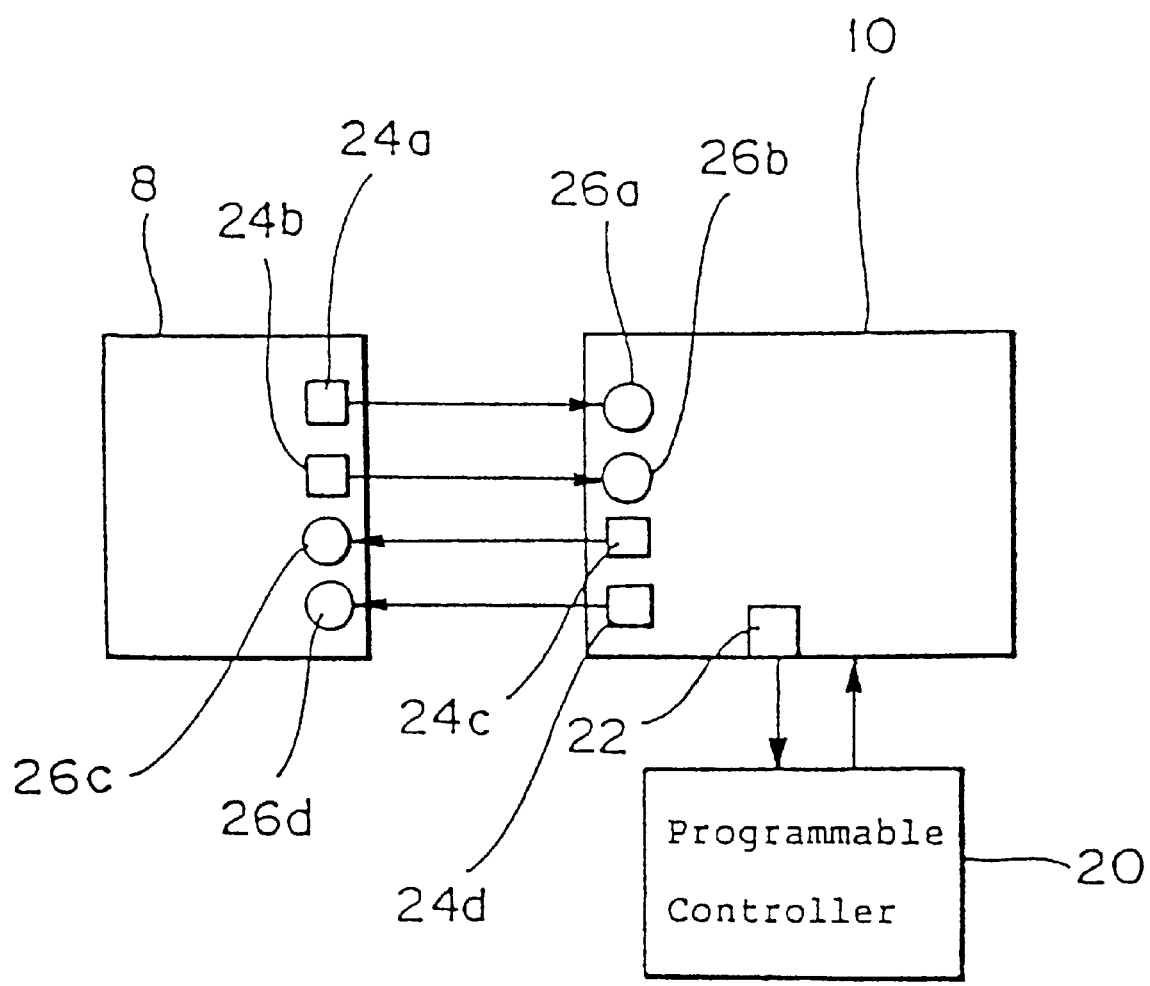
FIG. 2 is a schematic construction diagram showing the exchange of signals between a carrier and a station conveyor in the embodiment.

Referring to FIG. 2, there is illustrated a construction of an optical communication apparatus used in this embodiment for the exchange of information between the carrier 8 and each station conveyor 10. The operation of the station conveyor 10 is controlled by a programmable controller 20. On the station conveyor 10 there is provided a product sensor 22 for detecting whether a product is present on the station conveyor. For example, the product sensor 22 is constituted by a transmission type photosensor.

On the carrier 8 there are provided a first LED 24a which issues an unloading request signal for unloading product from the carrier 8 and a second LED 24b which issues a loading request signal for loading product onto the carrier 8. The station conveyor 10 is provided with first and second photodiodes 26a, 26b for receiving the unloading request signal and the loading request signal from the first and second LEDs 24a, 24b, respectively.

The station conveyor 10 is further provided with a third LED 24c which issues an unloading OK signal in accordance with the unloading request signal when there is no product on the station conveyor, and a fourth LED 24d which issues a loading OK signal in accordance with the loading request signal provided from the second LED 24b, when presence of the product has been detected by the product sensor 22 and there is no unloaded product unloaded from the carrier 8 on the station conveyor 10.

On the carrier 8 side there are further provided third and fourth photodiodes 26c, 26d for receiving the unloading OK signal from the third LED 24c and the loading OK signal from the fourth LED 24d, respectively.

Referring now to FIGS. 3(a) to 3(d), product unloading operations from the carrier to a work station in this embodiment will be described below.

Figure 3A:
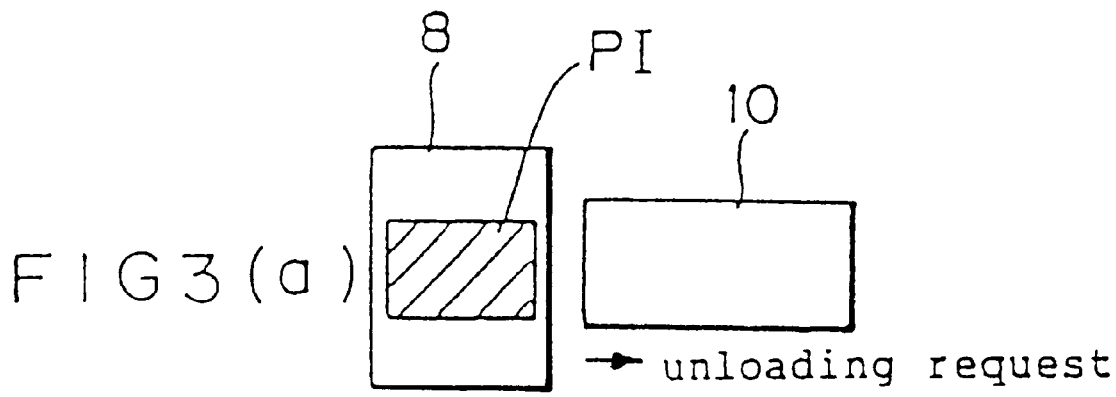
FIGS. 3(a) to 3(d) are explanatory views explaining product unloading operations from the carrier to a work station.
Figure 3B:
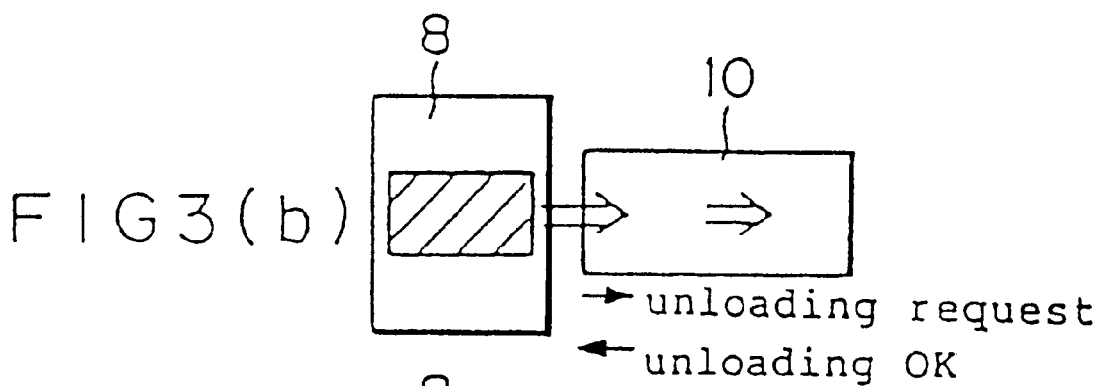
Figure 3C:
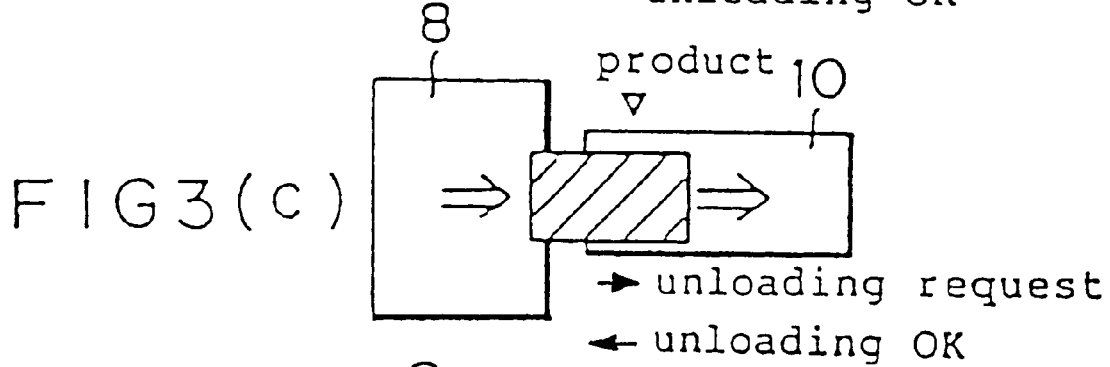
Figure 3D:
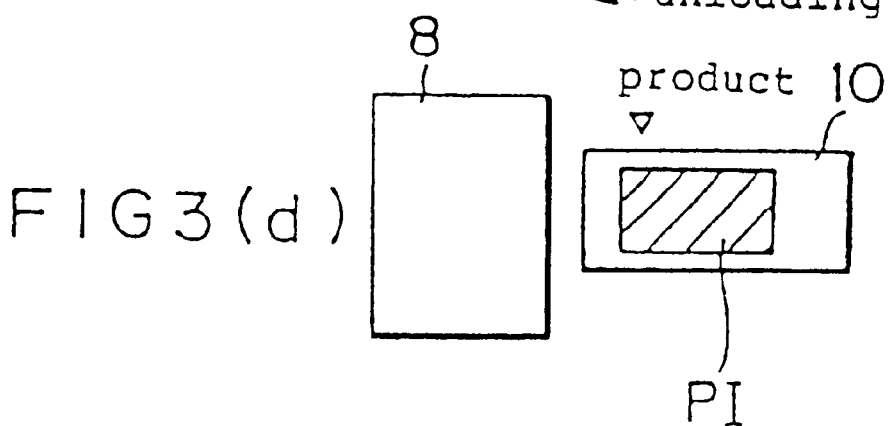

The carrier 8 detects a stop position opposed to a desired work station and stops automatically. When the carrier 8 issues an unloading request signal for the unloading of product PI as shown in FIG. 3(a), the station conveyor 10 side issues an unloading OK signal if there is no product on the conveyor as shown in FIG. 3(b). Upon receipt of the unloading OK signal on the carrier 8 side, the product PI is unloaded from the carrier 8 onto the station conveyor 10 as shown in FIG. 3(c). When the product sensor 22 of the station conveyor 10 detects the product PI, the issuance of the unloading request signal and that of the unloading OK signal are terminated after the lapse of a predetermined time. The state at the end of issuance of the unloading OK signal is as shown in FIG. 3(d). An unloaded product flag is turned on by the programmable controller 20 of the station conveyor 10, and it turns off when the unloading operation for the product PI is over and the product PI is no longer present on the station conveyor 10.

Thus, even when an unloading request signal is issued, the carrier 8 does not unload the product PI unless it receives an unloading OK signal from the station conveyor 10, whereby the collision of products on the station conveyor 10 is prevented.

Now, operations for loading product PO onto the carrier 8 will be described below with reference to FIGS. 4(a) to 4(d).

Figure 4A:
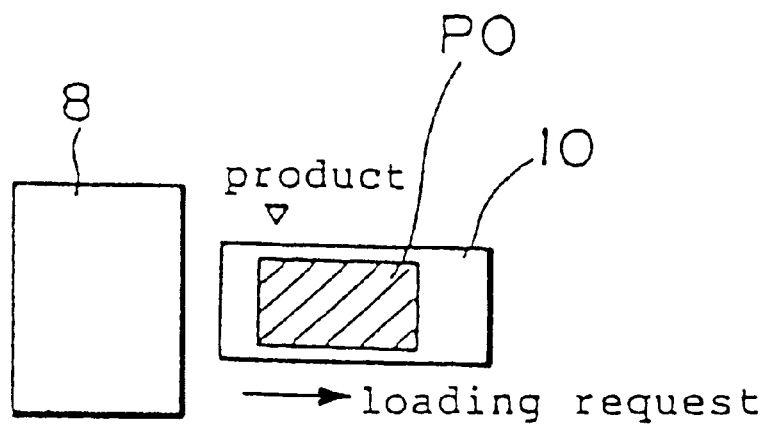
FIGS. 4(a) to 4(d) are explanatory views explaining product loading operations from the work station to the carrier.
Figure 4B:
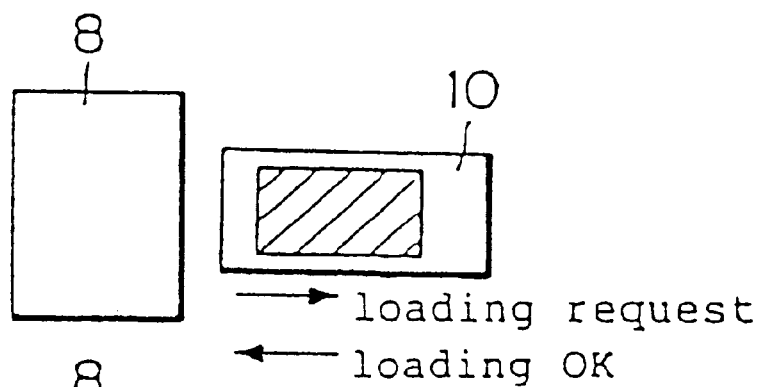
Figure 4C:
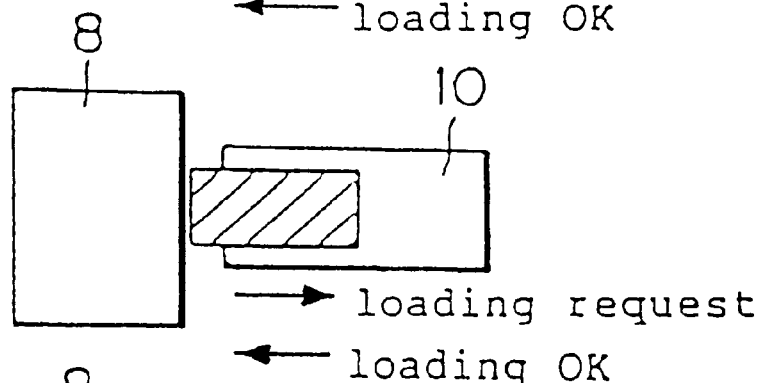
Figure 4:
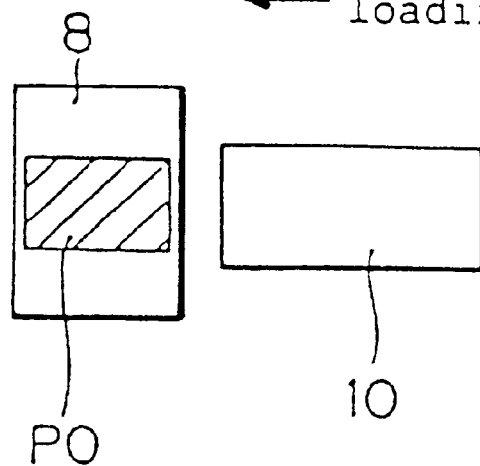

When the carrier 8 issues a loading request signal as shown in FIG. 4(a), the station conveyor 10 issues a loading OK signal as shown in FIG. 4(b) only when the unloaded product flag is not ON and the product sensor 22 detects the product PO. Once the loading OK signal is issued from the station conveyor 10, the station conveyor is driven and the product PO is thereby loaded onto the carrier 8 as shown in FIG. 4(c). When the product PO is loaded onto the carrier 8, the issuance of the loading request signal and that of the loading OK signal are terminated and the loading operation is completed, as shown in FIG. 4(d).

Next, continues operations involving unloading of product from the carrier and loading of product to the carrier will be described below with reference to FIGS. 5(a) to 5(j) and FIG. 6. In the timing chart of FIG. 6, times (a) to (j) correspond to the states of FIGS. 5(a) to 5(j), respectively.

Figure 5A:
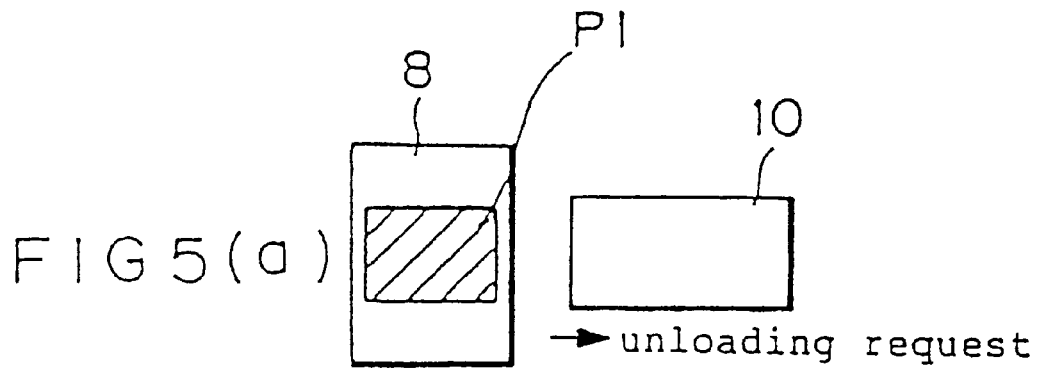
Figure 5B:
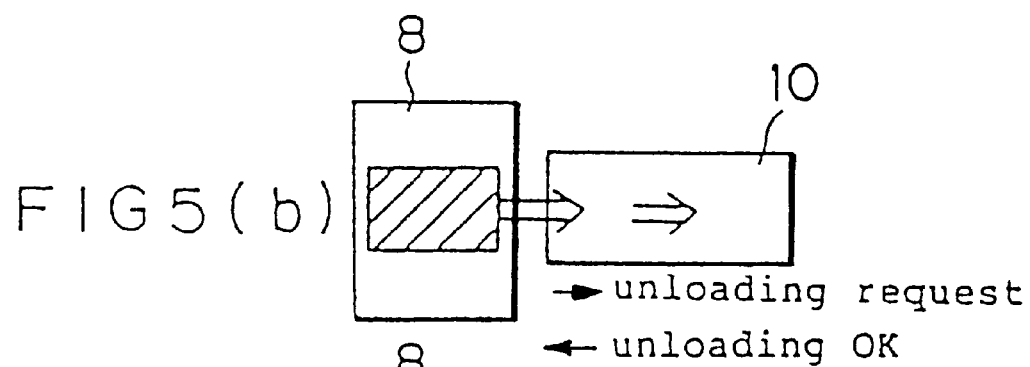
Figure 5C:
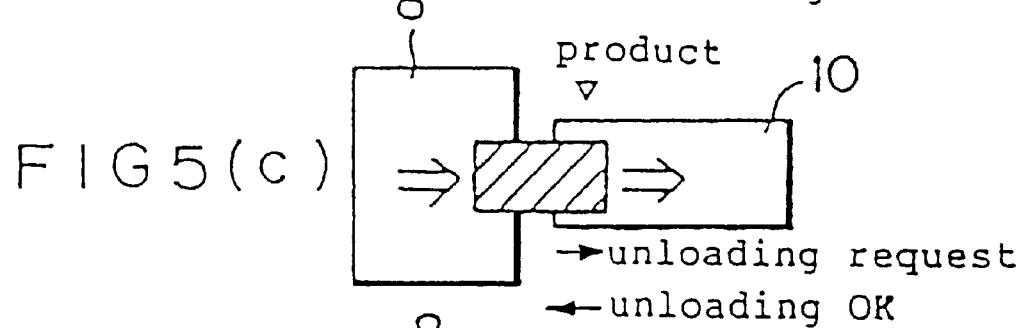
Figure 5D:
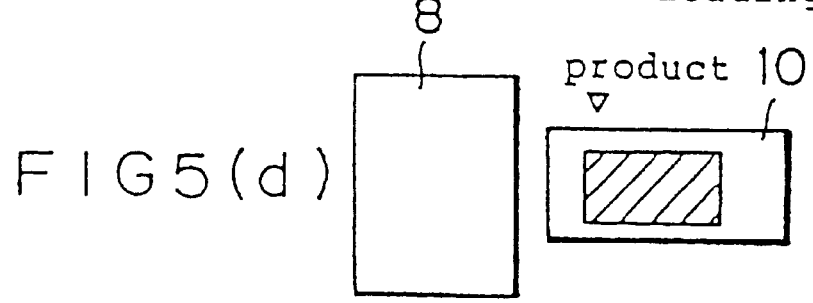
Figure 5E:
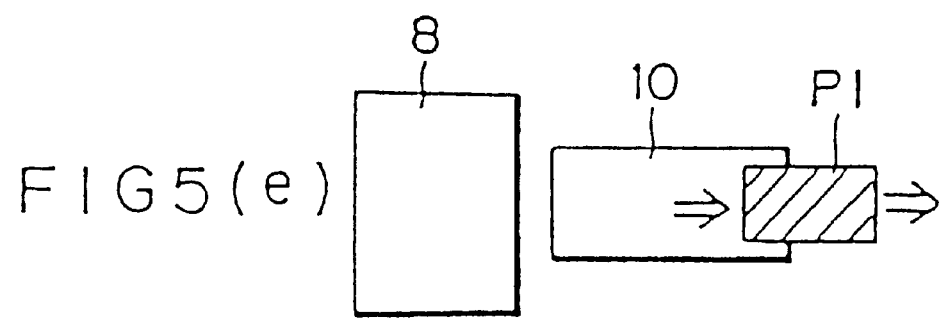
Figure 6:
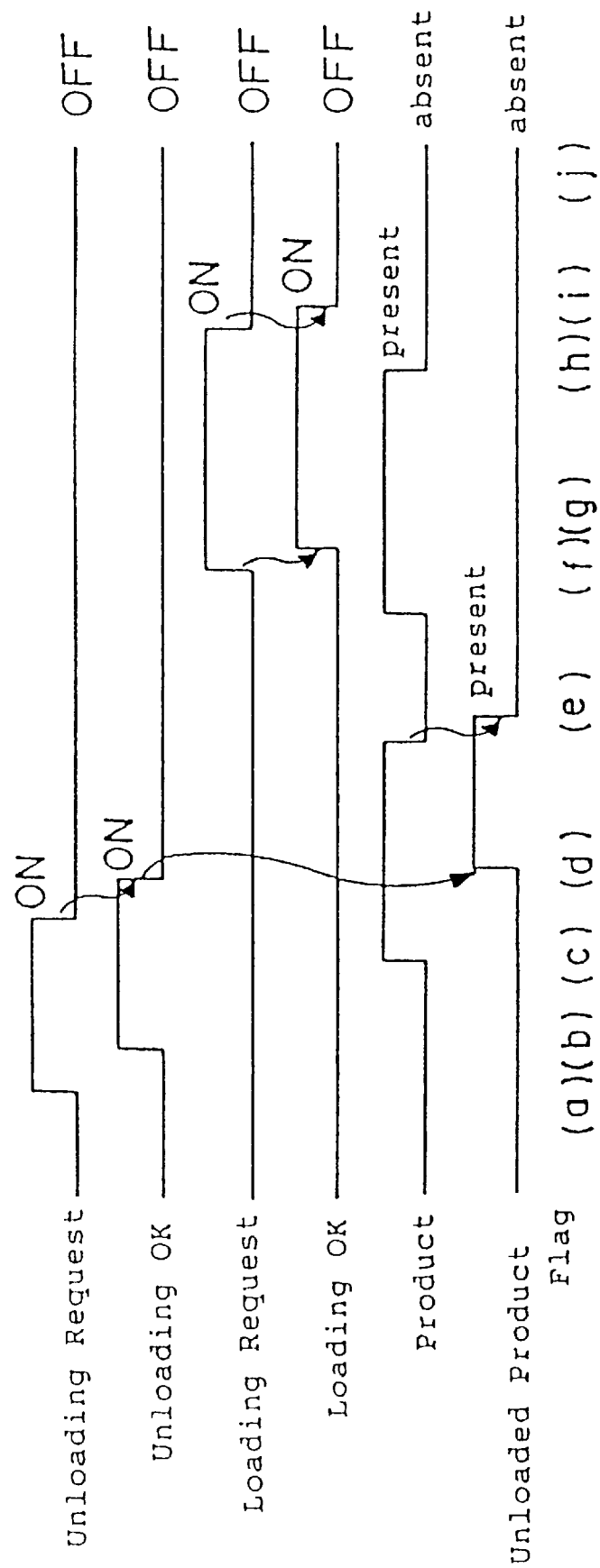
FIG. 6 is a timing chart showing operation timings of the operations illustrated in FIGS. 5(a) to 5(j)

FIGS. 5(a) to 5(d) are substantially the same as FIGS. 3(a) to 3(d) and illustrate unloading operations for product PI from the carrier 8. FIG. 5(e) illustrates the product PI being taken up from the station conveyor 10 by a worker and transferred to the work station. When the product PI unloading operation is over as shown in FIG. 5(d), the carrier 8 issues a loading request signal after the lapse of a predetermined time. During this predetermined time, the product PI is unloaded from the station conveyor 10 and product PO for loading to the carrier 8 is put on the station conveyor 10.

The loading operations illustrated in FIGS. 5(f) to 5(i) are substantially the same as in FIGS. 4(a) to 4(d). Since the unloaded product flag is provided in this embodiment, if the product PI unloaded from the carrier 8 is not taken out from the station conveyor 10 within the predetermined time, the flag is ON when a loading request signal is issued from the carrier 8 after the lapse of the predetermined time, so a loading OK signal will never be issued from the station conveyor 10, whereby a malfunction of loading the product PI once unloaded from the carrier 8 again onto the carrier 8 is prevented completely. When the product PO loading operation is over, the carrier 8 loaded with the product PO moves toward the next work station or the warehouse 6 as shown in FIG. 5(j).

Now, the buffer mechanism 12 disposed between the conveyance path 2 and the warehouse 6 will be described with reference to FIG. 7. The buffer mechanism 14 comprises a parting conveyor 14 having a first conveyor 14a and a second conveyor 14b, a stock conveyor 16 for the reception and delivery of products between the parting conveyor 14 and the warehouse 6; and a controller 30 for controlling both the parting conveyor 14 and the stock conveyor 16.

The parting conveyor 14 is movable between a first position in which the second conveyor 14b, occupies the broken line position in the figure and the first conveyor 14a occupies a product reception/delivery position aligned with the stock conveyor 16, and a second position indicated by the solid line in FIG. 7 in which the second conveyor 14b, occupies the product reception/delivery position. The product PI for warehousing and the product PO for delivery are conveyed while each being carried on a pallet 28. According to the state illustrated in the figure, the parting conveyor 14 has been moved to the second position to retract the delivery product PO on the first conveyor 14a, permitting the warehousing product PI to be transferred from the carrier 8 onto the second conveyor 14b.

The host computer 18 transmits to the controller 30 a warehousing command signal SI and a delivery command signal SO for instructing the warehouse 6 to perform warehousing and delivery. The controller 30 in turn transmits to the host computer 18 a warehousing product signal TI and a delivery product signal TO respectively indicating the presence of a product for warehousing and that of a product for delivery on the buffer mechanism 12. From the carrier 8 there is issued to the buffer mechanism 12 an arrival signal RCH indicating that the carrier has reached the front of the buffer mechanism 12, while from the buffer mechanism 12 there is issued to the carrier 8 a work end signal END indicating that the product PO for delivery has been loaded onto the carrier.

The following description is now provided about the operation of the buffer mechanism in this embodiment with reference to FIGS. 8(a) to 8(g).

FIG. 8(a) illustrates an initial state in which the first conveyor 14a of the parting conveyor 14 is aligned with the stock conveyor 16 and is placed in the product reception/delivery position. As shown in FIG. 8(b), a product PO for delivery is carried out from the warehouse 6 and is then conveyed by the stock conveyor 16 and put onto the first conveyor 14a of the parting conveyor 14. At this time, the carrier 8 which carries thereon a product PI for warehousing arrives in front of the buffer mechanism 12, as shown in FIG. 8(c). When the carrier 8 transmits the arrival signal RCH to the buffer mechanism, the parting conveyor 14 is moved to the second position to retract the product PO for delivery, whereby the product PI for warehousing on the carrier 8 is transferred onto the second conveyor 14b of the parting conveyor 14, as shown in FIG. 8(d).

Thereafter, for quick delivery of the product PO onto the carrier 8, the parting conveyor 14 is again moved as indicated by arrow in FIG. 8(d) and the first conveyor 14a occupies the product reception/delivery position. As a result, the product PO for delivery is transferred onto the carrier 8 from the first conveyor 14a and the work end signal END is issued to the carrier 8 from the buffer mechanism 12, whereupon the carrier starts the conveyance of the product PO.

Figure 8E:
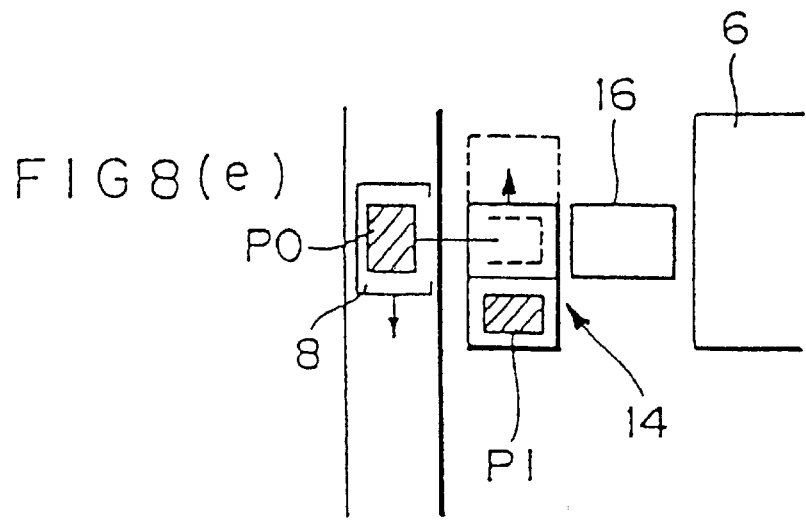
Figure 8F:
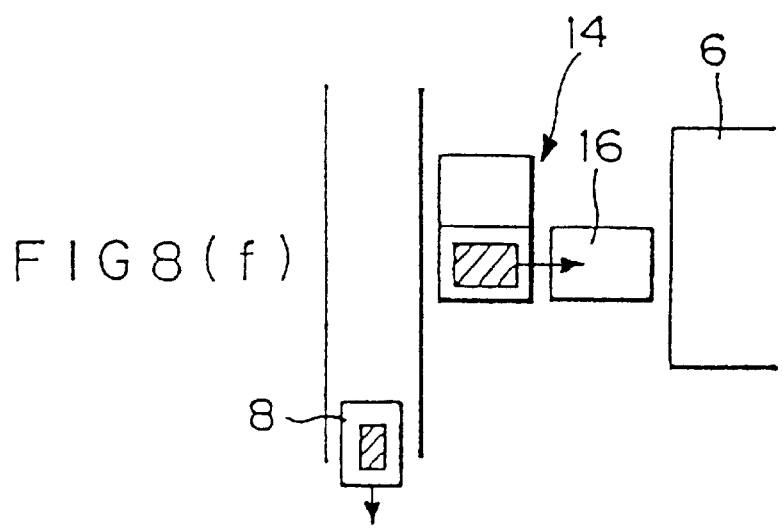
Figure 8G:
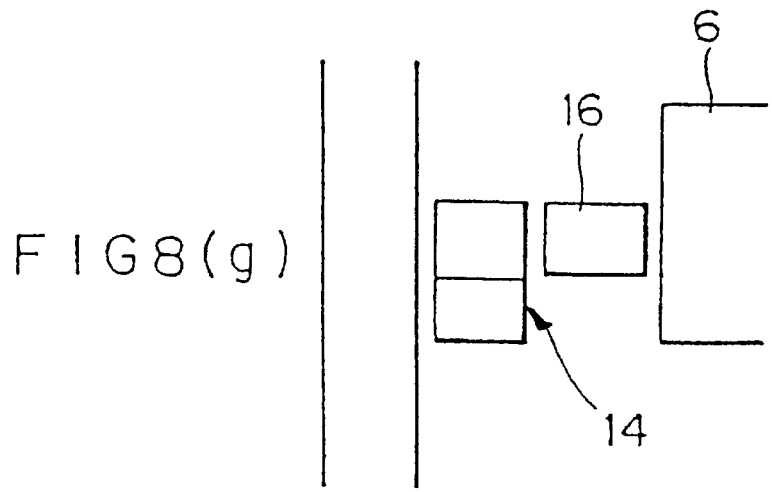

Since the product PI for warehousing may be handled relatively slowly, the parting conveyor 14 is drived to the second position and the product PI on the second conveyor 14b, is carried into the warehouse 6 through the stock conveyor 16, as shown in FIG. 8(f). Then, the parting conveyor 14 is driven to the first position shown in FIG. 8(g). Now, a series of operations are over.

In the case where the product PI for warehousing and the product PO for delivery are not in concurrence with each other on the buffer mechanism 12, the parting conveyor 14 is held in the first position and there are performed warehousing and delivery of the products.

INDUSTRIAL APPLICABILITY

According to the automatic product conveying system of the present invention, it is possible to effect the unloading of product from the carrier to a work station or the loading of product from the work station to the carrier without causing collision of the products with each other by a construction having a simple communication apparatus and using a single station conveyor, not requiring linking between the carrier control system and the station conveyor control system. Since the communication between the carrier and the station conveyor is realized by a very simple construction, the cost can be kept low and it is easy to increase the number of such station conveyor.

Further, between the warehouse and the conveyance path there is provided a buffer mechanism having a parting conveyor capable of moving between first and second positions, so in the event of concurrence of a product for warehousing and a product for delivery, the product for delivery can be carried out rapidly while avoiding collision of both products, whereby the delay in the delivery of product from the warehouse can be prevented and hence the ability of each work station can be exhibited to the utmost.

We claim:

1. A communication system for communicating between a movable unit and a fixed unit, said communication system comprising:

a first signal transmitting and receiving system on the movable unit, transmitting status request signals and receiving status response signals;

means, on the movable unit, for controlling movement of the movable unit responsive to the status response signals;

a status detector on the fixed unit, said status detector detecting status of the fixed unit;

a second transmitting and receiving system on the fixed unit, coupled to said status detector, receiving the status request signals and transmitting the status response signals responsive to the status request signals and as indicated by the status of the fixed unit, wherein the fixed unit comprising plural autonomous workstations and an autonomous product warehouse, and the movable unit comprising an autonomous carrier for conveying products between the work stations;

an annular conveyance path formed along the work stations with the carrier conveying products along the annular conveyance path;

autonomous station conveyor means disposed between the work stations and the conveyance path for conveying products from the work stations to the carrier or from the carrier to the work stations;

first control means for controlling the operation of the station conveyor means; and autonomous buffer means disposed between the product warehouse and the conveyance path for the reception and delivery of products between the warehouse and the carrier, wherein said first signal transmitting and receiving system comprising first communication means for the communication of loading and unloading status information of products between the carrier and the station conveyor means, wherein said second signal transmitting and receiving system comprising second communication means for the communication of status information on the loading and unloading of products between the carrier and the buffer means, wherein said status detector comprising first detector means for detecting the presence of product on the station conveyor means, wherein said system further comprising second detector means for detecting the presence of product unloaded onto the station conveyor means from the carrier, wherein said means for controlling comprising collision avoidance means for avoiding collision of products by preventing the unloading of products onto the station conveyor means by the carrier responsive to detection by said first detector means, and wherein said first communication means comprises:

first and second light emitting elements provided on the carrier and producing an unloading request signal and a loading request signal, respectively;

first and second light sensing elements provided on the station conveyor means and receiving said unloading request signal and loading request signal, respectively;

a third light emitting element provided on the station conveyor means and producing an unloading OK signal in accordance with said unloading request signal when there is no product on the station conveyor means;

a fourth light emitting element provided on the station conveyor means and producing a loading OK signal in accordance with said loading request signal when the presence of product has been detected by the first detector means and the presence of unloaded product not detected by the second detector means; and third and fourth light sensing elements provided on the carrier and receiving said unloading OK signal and loading OK signal, respectively.

2. A system as recited in claim 1, wherein the transmitting and receiving of said second transmitting and receiving system is performed using electromagnetic signals.

3. A system as recited in claim 1, wherein said second signal transmitting and receiving system comprises light emitting elements and light sensing elements performing the transmitting and receiving.

4. A system as recited in claim 1, wherein said buffer means comprises:

first conveyor means having first and second conveyors disposed in parallel with each other, the first conveyor means being capable of moving between a first position in which the first conveyor occupies a predetermined product loading/unloading position and a second position in which the second conveyor occupies said predetermined product loading/unloading position;

conveyor status means for communicating position status;

second conveyor means for the reception and deliver of products between the first conveyor means and the warehouse; and second control means for controlling the operations of the first and second conveyor means.

5. A system as recited in claim 1, wherein said second communication means transmits to said buffer means an arrival signal indicating that the carrier has arrived at the front of the buffer means and also transmits to the carrier a work end signal indicating that the buffer means has loaded the product for delivery onto the carrier.

6. A system as recited in claim 1, further comprising:

a host computer for the control of delivery from and warehousing into the product warehouse;

means for transmitting a delivery command signal and a warehousing command signal from the host computer to the buffer means;

third and fourth detector means for respectively detecting the presence of product for delivery and product for warehousing on the buffer means;

means for transmitting from the buffer means to the host computer a delivery product presence signal and a warehousing product presence signal as detected signals provided by said third and fourth detector means; and means for preventing collisions of product on the buffer means responsive to the detector means.

* * * * *